United States Patent [19]

Nakayama et al.

[11] Patent Number: 4,800,648
[45] Date of Patent: Jan. 31, 1989

[54] METHOD OF CONNECTING WIRE HARNESS FOR AUTOMOBILE VEHICLE

[75] Inventors: Yoshiaki Nakayama; Shinichi Ueda, both of Shizuoka, Japan

[73] Assignee: Yazaki Corporation, Japan

[21] Appl. No.: 126,718

[22] Filed: Nov. 30, 1987

[51] Int. Cl.$^4$ ............................................. H01R 43/00
[52] U.S. Cl. ......................................... 29/854; 29/857; 49/502; 179/72 A; 296/146; 439/34
[58] Field of Search ................. 29/854, 857, 869, 858; 49/502; 174/72 A; 296/196; 439/34, 209, 210, 213, 214

[56] References Cited

U.S. PATENT DOCUMENTS

| 4,653,799 | 3/1987 | Arai et al. | 296/146 |
| 4,750,265 | 6/1988 | Watanabe et al. | 29/854 |

FOREIGN PATENT DOCUMENTS

| 3530413 | 2/1987 | Fed. Rep. of Germany | 296/146 |
| 56-154316 | 11/1981 | Japan | 174/72 A |
| 2164609 | 3/1986 | United Kingdom | 439/34 |
| 2166603 | 5/1986 | United Kingdom | 439/34 |

Primary Examiner—Carl J. Arbes
Attorney, Agent, or Firm—Wigman & Cohen

[57] ABSTRACT

To facilitate wiring work of electric devices housed within an automotive vehicle door via a wire harness, connector windows are formed in the trim cover; the wire harness is fixed to the inside of the trim cover by inserting the harness connectors into the connector windows; electric device connectors are fixed to the door frame at positions corresponding to the connector windows; the trim cover is fixed to the door frame by inserting the electric device connectors into the connector windows side by side with the harness connectors; and the electric device connectors and the harness connectors are connected, respectively, from outside the trim cover.

10 Claims, 5 Drawing Sheets

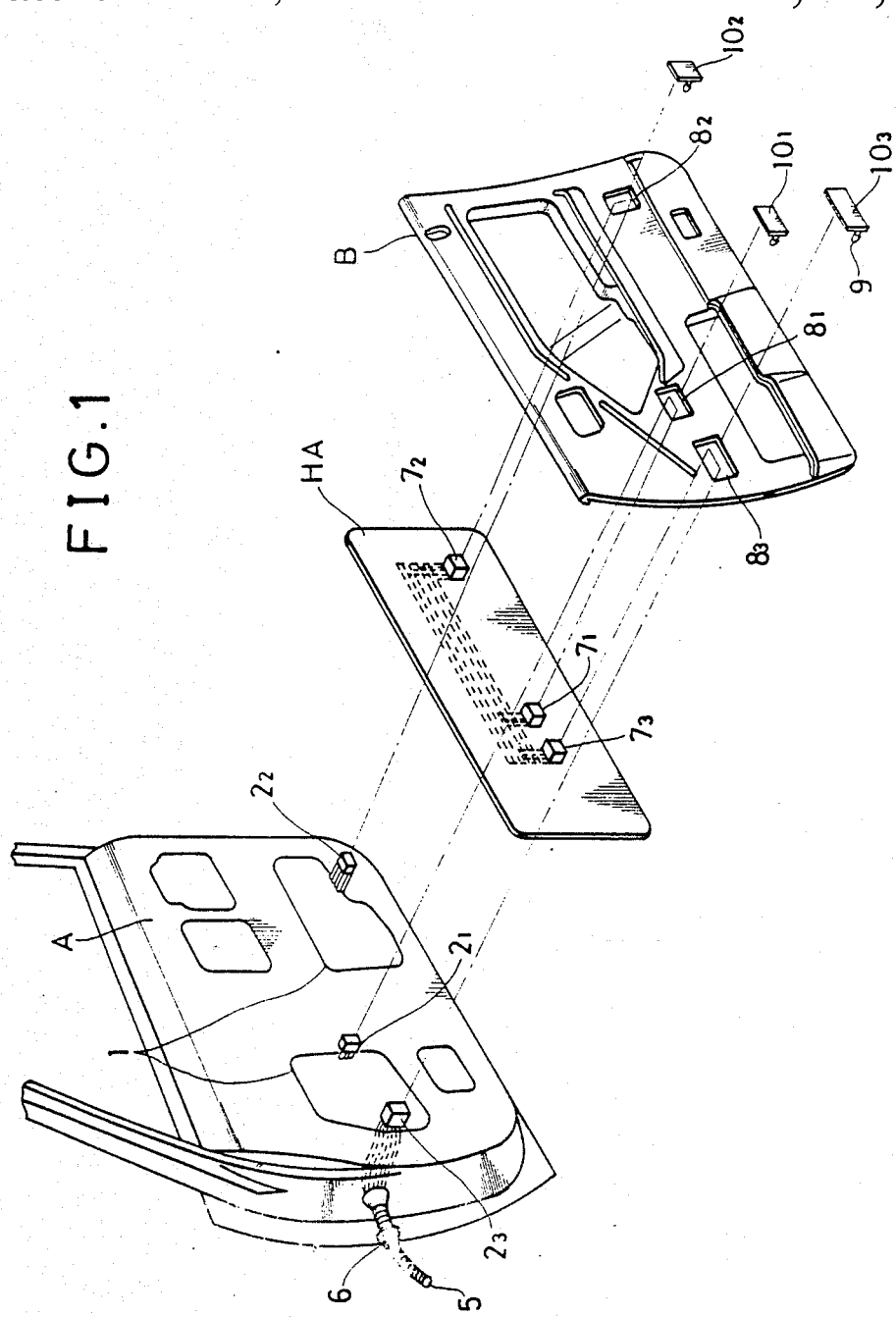

METHOD OF CONNECTING WIRE HARNESS FOR AUTOMOBILE VEHICLE

BACKGROUND OF THE INVENTION

1. Field of the Invention

The present invention relates to a method of connecting a wire harness for an automotive vehicle and more specifically to a method of connecting a wire harness disposed between a door frame and a trim cover to various electric devices housed in an automotive vehicle door.

2. Description of the Prior Art

A door of an automotive vehicle is composed of an outside door frame and an inside cover plate (called trim cover). A plurality of electric devices such as a power window motor, a door locking solenoid, etc. are mounted within the door frame, and a number of electric devices such as a curtain lamp, a trunk lid open switch, a power window switches, etc. are arranged on the trim cover.

To effectively wiring these various electric devices, the applicant has already proposed a method of using a wire harness disposed on the inside surface of the trim cover.

In the above-mentioned wire harness method, since connectors connected to electric devices housed within the door frame should be connected to mate harness connectors connected to the wire harness disposed on the inside surface of the trim cover simultaneously when the trim cover is attached to the door frame, there exist various problems in that the electric device connectors and the wire harness connectors should be positioned precisely so as to be mated, respectively; the connecting work of these connectors is difficult and troublesome because the worker cannot well see the harness connectors from the outside of the trim cover (because the wire harness is sandwiched between the door frame and the trim cover); it is difficult to perfectly eliminate mulconnections between two connectors mounted on the door frame and the trim cover, respectively. In addition, when the number of conductor pins of the connector increases, since a relatively large insertion force is required to connect these two mated connectors within a small and narrow space formed between the door frame and the trim cover, it has taken a long time, and therefore the productivity was poor.

SUMMARY OF THE INVENTION

With these problems in mind, therefore, it is the primary object of the present invention to provide a method of connecting a wire harness sandwiched between a door frame and a trim cover to various electric devices housed in an automotive vehicle door, which can facilitate wire harness connecting work and also maintenance work, while improving wire harness connection reliability to electric devices arranged within the automotive vehicle door.

To achieve the above-mentioned object, a method of connecting a wire harness disposed between a door frame and a trim cover to at least one electric device housed in an automotive vehicle door, of the present invention, comprises the following steps of: (a) forming at least one connector window in the trim cover; (b) fixing the wire harness to an inside surface of the trim cover by inserting at least one harness connector connected to the wire harness into the connector window; (c) fixing at least one electric device connector connected to the electric device to the door frame at a position corresponding to the connector window; (d) fixing the trim cover to the door frame by inserting the electric device connector into the connector window side by side with the harness connector; and (e) connecting the electric device connector with the harness connector from outside the trim cover.

In the first aspect of the present invention, the electric device connector is flexibly fixed to the door frame and bendable, after having been inserted into the connector window formed in the trim cover, so as to be engaged with the wire harness connector with a connection direction perpendicular or parallel to the surface of the trim cover. Further, after having been bent, the electric device connector can be slidably engaged with printed circuit board conductors of the wire harness connector.

In the second aspect of the present invention, the electric device connector is fixedly secured to the door frame with the connector direction perpendicular to the surface of the trim cover and the harness connector is inserted into the connector window with a connection direction also perpendicular to the surface of the trim cover. The electric device connector and the harness connector are connected by a shorting connector cover having two connector boxes and shorting conductors. The shorting conductors are wires, harness, bus bars, etc.

BRIEF DESCRIPTION OF THE DRAWINGS

The features and advantages of the method of connecting a wire harness for an automotive vehicle according to the present invention will be more clearly appreciated from the following description taken in conjunction with the accompanying drawings in which like reference numerals designate the same or similar elements and in which:

FIG. 1 is an exploded view showing a door frame, a wire harness and a trim cover constituting a door for an automotive vehicle, for assistance in explaining the method of the present invention;

FIG. 5A-1 is a perspective view for assistance in explaining a second aspect of the method of the present invention, in which the electric device connector and the harness connector are shorted by a connector cover;

FIG. 5A-2 is a perspective view showing only the connector cover shown in FIG. 5A-1 when seen from the opposite side from that shown in FIG. 5A-1;

DETAILED DESCRIPTION OF THE PREFERRED EMBODIMENTS

With reference to the attached drawings, the method of connecting a wire harness for an automotive vehicle according to the present invention will be described hereinbelow.

Figures 1, 5A:
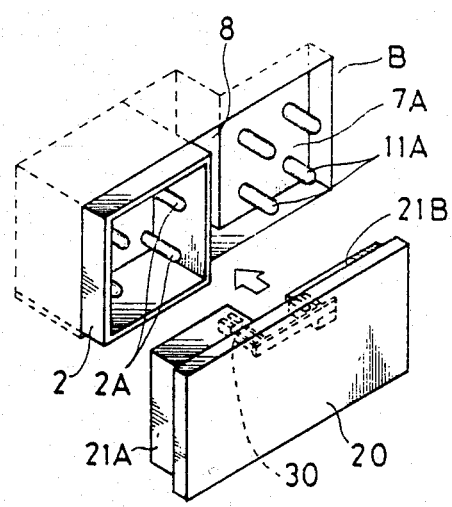
Figures 2, 5A:
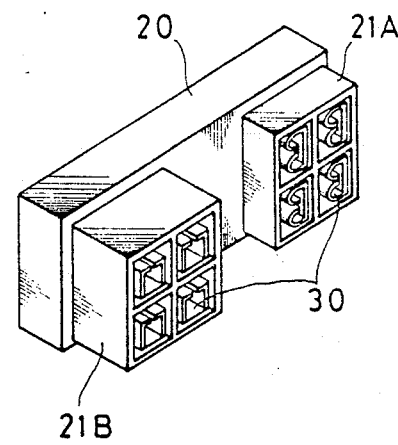

In FIG. 1, a vehicle door is roughly composed of a door frame A (a front, right side door frame) and a trim cover B provided on the inside of the door frame A. To connect various electric devices arranged in the door frame A and the trim cover B, a wire harness HA is attached to the inside surface (door frame side) of the trim cover B.

Figure 2:
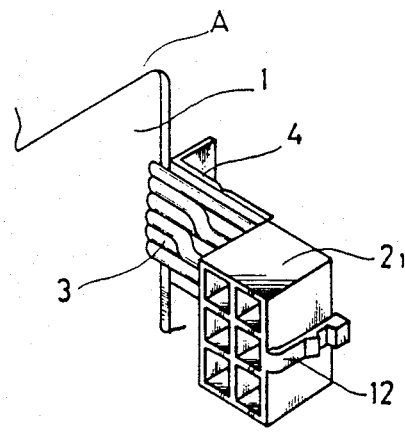
FIG. 2 is a perspective view showing a first aspect of the method of the present invention.

A plurality of access windows 1 are formed on an inner surface of the door frame A, so that various electric devices (e.g. power window motor) are inserted through these access windows and mounted therein. Further, a number of electric device connectors $2_1$, $2_2$ and $2_3$, one extending from each device, are fixed near window edges separately, as shown in FIG. 2. In FIG. 2, the wires 3 connected between the electric devices (not shown) and the device connector 2 are made of a flexible wire cable or bus bars. Further, when the device connector 2 is required to be stably supported by the door frame A, a flexible reinforcing plate 4 is preferably attached. Therefore, the device connectors 2 can be bent at least 90 degrees.

Further, in FIG. 1; the reference numeral 5 denotes a cable extending from the cowl (the front part of a vehicle body) side of a passenger compartment, which is guided into the door frame through a waterproof grommet 6 provided at a side edge of the door frame A.

On the other hand, the trim cover B is also formed with a number of connector windows $8_1$, $8_2$ and $8_3$. The wire harness HA is provided with a number of harness connectors $7_1$, $7_2$ and $7_3$ at such positions corresponding to the connector windows $8_1$, $8_2$, $8_3$, respectively. Here, it should be noted that the device connector $2_1$ and the harness connector $7_1$ are both fitted to the connector window $8_1$ side by side; the device connector $2_2$ and the harness connector $7_2$ are both fitted to the connector window $8_2$ side by side, and so on.

In more detail, the device connector $2_1$ is fitted to the right side of the window $8_1$ and the harness connector $7_1$ is fitted to the left side of the window $8_1$. The device connector $2_2$ is fitted to the upper side of the window $8_2$ and the harness connector $7_2$ is fitted to the lower side of the window $8_2$, and so on.

In assembly, the wire harness HA is fixed to the inside surface of the trim cover B by inserting the harness connectors 7 connected to the wire harness into the connector windows 8; the electric device connectors 2 connected to the electric devices are fixed to the door frame A at positions corresponding to the connector windows 8, respectively; the trim cover B is fixed to the door frame A by inserting each electric device connector 2 into each connector windows 8 side by side with each harness connector 7; and lastly the electric device connectors 2 are connected with the harness connectors 7, respectively, from outside the trim cover B in the methods described later in more detail. Further, where necessary, the connector covers 10 each provide with a locking claw 9 (shown in FIG. 1) are fitted to the connector windows 8, respectively.

FIG. 2 shows an electric device connector 2, used in the first aspect of the method of the present invention, in which the connector is flexibly fixed to the door frame so as to be bendable, after having been inserted into the connector window 8 formed in the trim cover B.

Figure 3A:
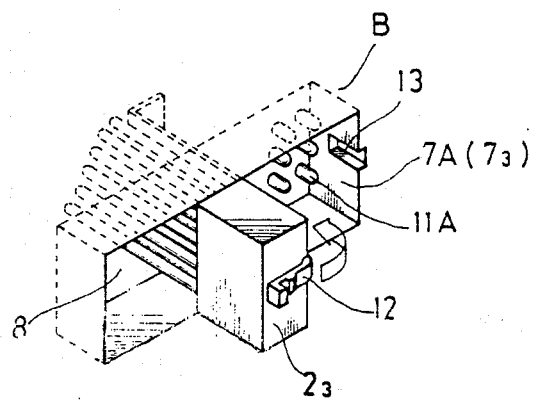
FIG. 3A is a perspective view for assistance in explaining a first aspect of the method of the present invention, in which a female electric device connector is bent 90 degrees and engaged with a male harness connector with connector pins extending perpendicular to the surface of the trim cover.
Figure 3B:
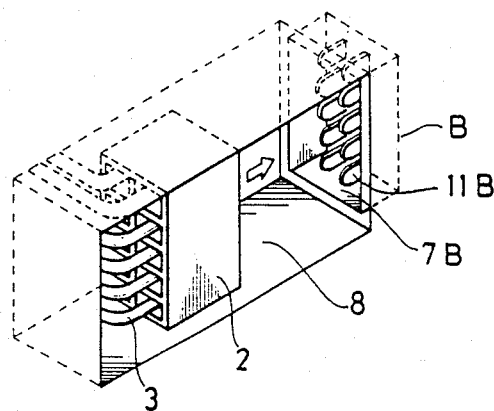
FIG. 3B is a perspective view for assistance in explaining the first aspect of the method of the present invention; in which a female electric device connector is bent 90 degrees and engaged with a male harness connector with connector pins extending parallel to the surface of the trim cover.
Figure 3C:
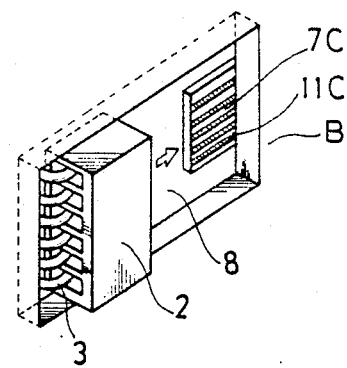
FIG. 3C is a perspective view for assistance in explaining the first aspect of the method of the present invention, in which a female electric device connector is bent 90 degrees and slidably engaged with a harness connector formed by printed circuit board extending parallel to the surface of the trim cover.

FIGS. 3A, 3B and 3C show the structures of the device connector 2 and the harness connector 7 in the first aspect of the method of the present invention.

In FIG. 3A, rod-shaped connector pins 11 of the harness connector 7A are provided extending perpendicular to the surface of the trim cover B. When the device connector 2 is bent 90 degrees at a position where the connector 2 is engageable with the harness connector 7A, a lock arm 12 of the device connector 2 is fixedly engaged with a lock groove 13 formed at an edge of the connector window 8. In this structure, since the female device connector 2 ($2_3$) can be engaged with the male harness connector 7A ($7_3$) in the direction perpendicular to the door surface, the connector engagement work is easy even if the number of connector pins 11 is large.

In FIG. 3B, plate-like connector pins 11B of the harness connector 7B are provided extending parallel to the surface of the trim cover B. After the device connector 2 is bent 90 degrees, the connector 2 is slidably engaged with the male harness connector 7B. This structure is suitable when the number of pins 11B is relatively small. Further, the harness connector 7B shown in FIG. 3B can be attached to a connector window 8 from the side surface of the trim cover B.

In FIG. 3C, connector conductors 11C of the harness connector 7C are formed on a printed circuit board. In this example, it is possible to reduce an engagement force between the two connectors 2 and 7C. In this example, the device connector box is engaged with the conductor plate.

Figure 4:
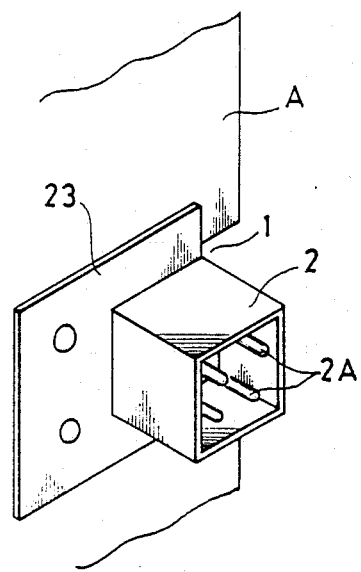
FIG. 4 is a perspective view showing a second aspect of the method of the present invention.

FIG. 4 shows an electric device connector 2 used in the second aspect of the method of the present invention, in which the electric device connector 2 is fixedly secured to the door frame A with a connection direction perpendicular to the surface of the trim cover. In this aspect, the harness connector 7 is inserted into the connector window with the connection direction also perpendicular to the surface of the trim cover.

FIGS. 4, 5A-1, 5A-2, 5B, 5C and 5D show the structures of the device connector 2 and the harness connector 7 in the second aspect of the method of the present invention.

In FIG. 4, the device connector 2 having male connector pins 2A is fixed to the door frame A by means of a mounting plate 23, so that the connector pins 2A extend in the direction perpendicular to the surface of the door frame and the trim cover. Further, it is possible to directly fix the device connector 2 to the door frame A with screws, for instance, without use of the mounting plate 23.

In FIG. 5A-1, rod-shaped connector pins 11A of the harness connector 7A (the same as shown in FIG. 3A) and those 2A of the device connector 2 both extend in the direction perpendicular to the surface of the trim cover B. The device connector 2 and the harness connector 7A are connected by a shorting connector cover 20 formed with two connector boxes 21A and 21B and shorting conductors 30. Therefore, in this structure, when the connector boxes 21A and 21B are fitted to the two device and harness connectors 2 and 7A, these two connectors 2 and 7A are connected to each other. The shorting conductors 30 are bare conductors, insulated conductors, bus bars, etc. FIG. 5A-2 shows the shorting connector cover 20 when seen from the opposite side from that shown in FIG. 5A-1.

Figure 5B:
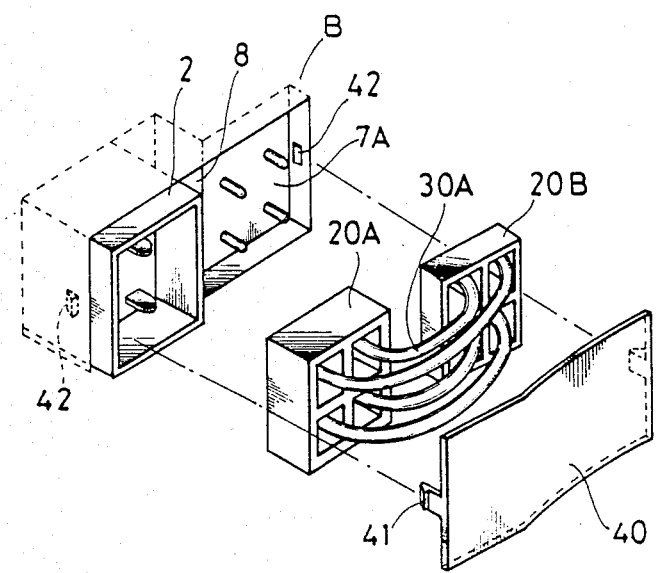
FIG. 5B is a perspective view for assistance in explaining the second aspect of the present invention, in which the electric device connector and the harness connector are shorted by two separate connector covers connected by wires.

FIG. 5B shows another modification, in which the connector cover is divided into two 20A and 20B and connected by wires 30A. The feature of this modification is that the distance between the two device and harness connectors 2 and 7A is not strict in production process precision. However, an additional connector cover 40 having two locking claws 41 fittable to two grooves 42 formed in the connectors 2 and 7A is required.

Figure 5C:
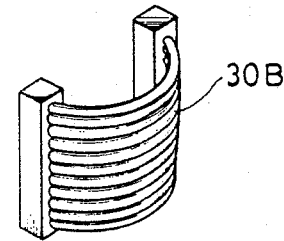
FIG. 5C is a perspective view for assistance in explaining the second aspect of the present invention, in which the electric device connector and the harness connector are shorted by a flat wire harness.
Figure 5D:
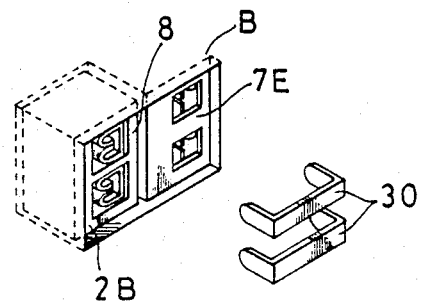
FIG. 5D is a perspective view for assistance in explaining the second aspect of the present invention, in which the electric device connector and the harness connector are shorted by bus bars.

FIG. 5C shows another modification, in which the wire 30A shown in FIG. 5B is replaced with a wire harness 30B. Further, FIG. 5D shows another modification in which female device and harness connectors 2B and 7E are shown. In these connectors, the connector terminals are shorted by two bus bars 30C, for instance.

As described above, in the method of connecting electric devices arranged in an automotive vehicle door via a wire harness, connector windows are formed in a trim cover; a wire harness is attached to an inside surface of the trim cover with harness connectors fitted to the connector windows, respectively; device connectors are fitted to the connector window, respectively side by side with the harness connector; and the device connectors and the harness connectors are connected, respectively, from the outside of the trim cover. Therefore, it is possible to facilitate wire harness connecting work because the worker can well see both the device connectors and harness connectors easily from the outside of trim cover side, thus improving the productivity, reliability of the door device wiring work.

What is claimed is:

1. A method of connecting a wire harness disposed between a door frame and a trim cover to at least one electric device housed in an automotive vehicle door, which comprises the following steps of:

(a) forming at least one connector window in the trim cover;
    (b) fixing the wire harness to inside the trim cover by inserting at least one harness connector connected to the wire harness into the connector window;
    (c) fixing at least one electric device connector connected to the electric device to the door frame at a position corresponding to the connector window;
    (d) fixing the trim cover to the door frame by inserting the electric device connector into the connector window side by side with the harness connector; and
    (e) connecting the electric device connector with the harness connector from outside the trim cover.

2. The method of claim 1, wherein the electric device connector is flexibly fixed to the door frame and bendable after having been inserted into the connector window formed in the trim cover.

3. The method of claim 2, wherein the electric device connector is bent 90 degrees and connected with the wire harness connector with a connection direction perpendicular to a surface of the trim cover.

4. The method of claim 2, wherein the electric device connector is bent 90 degrees and connected with the wire harness connector with a connection direction parallel to a surface of the trim cover.

5. The method of claim 2, wherein the electric device connector is bent 90 degrees and slidably connected with printed circuit board conductors of the wire harness connector with a connection direction parallel to a surface of the trim cover.

6. The method of claim 1, wherein the electric device connector is fixedly secured to the door frame in a connection direction perpendicular to a surface of the trim cover and the harness connector is inserted into the connector window in a connection direction also perpendicular to the surface of the trim cover.

7. The method of claim 6, wherein the electric device connector and the harness connector are connected by a shorting connector cover having two connector boxes fittable to each of the electric device connector and the harness connector, and shorting conductors.

8. The method of claim 6, wherein the electric device connector and the harness connector are connected by wires.

9. The method of claim 6, wherein the electric device connector and the harness connector are connected by a flat wire harness.

10. The method of claim 6, wherein the electric device connector and the harness connector are connected by bus bars.

* * * * *